United States Patent [19]
Ballenger et al.

[11] Patent Number: 4,995,973
[45] Date of Patent: Feb. 26, 1991

[54] MODULAR LONGITUDINAL SPRAY FINISHER

[75] Inventors: William Ballenger; Wayne Sherman; Michael Suter, all of Lakeland, Fla.

[73] Assignee: FMC Corporation, Chicago, Ill.

[21] Appl. No.: 319,021

[22] Filed: Mar. 6, 1989

[51] Int. Cl.⁵ ............................................. B01D 35/22
[52] U.S. Cl. .................................. 210/209; 210/420; 210/433.1; 210/437; 210/456; 210/497.3; 209/152; 209/190; 209/284; 209/498
[58] Field of Search ............... 210/418, 420, 422, 423, 210/456, 437, 457, 433.1, 497.01, 209, 497.3; 209/152, 182, 190, 201, 273, 284, 498, 500, 906

[56] References Cited

U.S. PATENT DOCUMENTS

| | | | |
|---|---|---|---|
| 3,530,993 | 9/1970 | Fulton | 210/422 |
| 4,257,890 | 3/1981 | Hurner | 210/456 |
| 4,462,900 | 7/1984 | Matthew | 210/456 |

*Primary Examiner*—Robert A. Dawson
*Assistant Examiner*—Wanda L. Millard
*Attorney, Agent, or Firm*—Douglas W. Rudy; Richard B. Megley

[57] ABSTRACT

A juice processing module is provided in a raw juice stream to aid in the separation of the juice stream into clarified juice and pulpy juice. Raw juice is forced through directed orifices at a separating screen carried in a containment housing. Juice outlet ports are provided for the clarified juice and the pulpy juice.

6 Claims, 2 Drawing Sheets

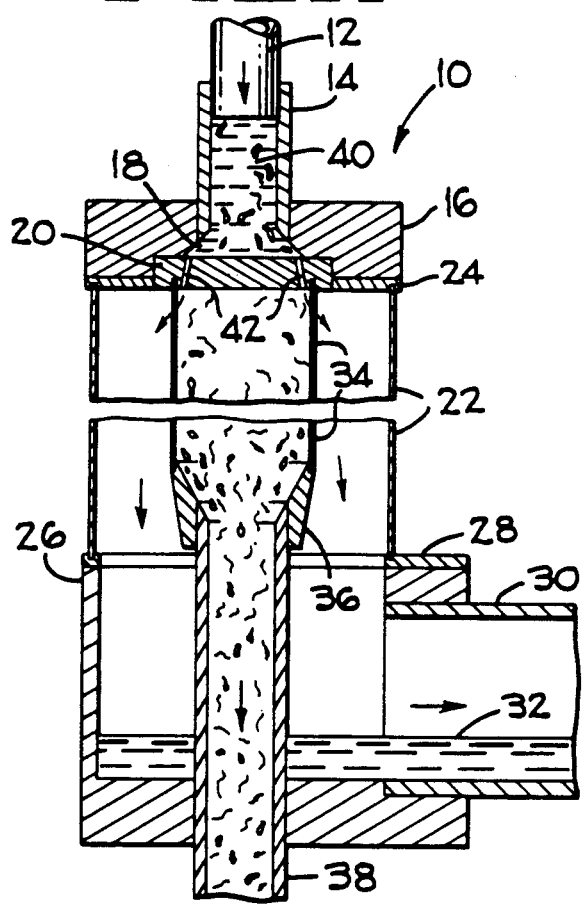
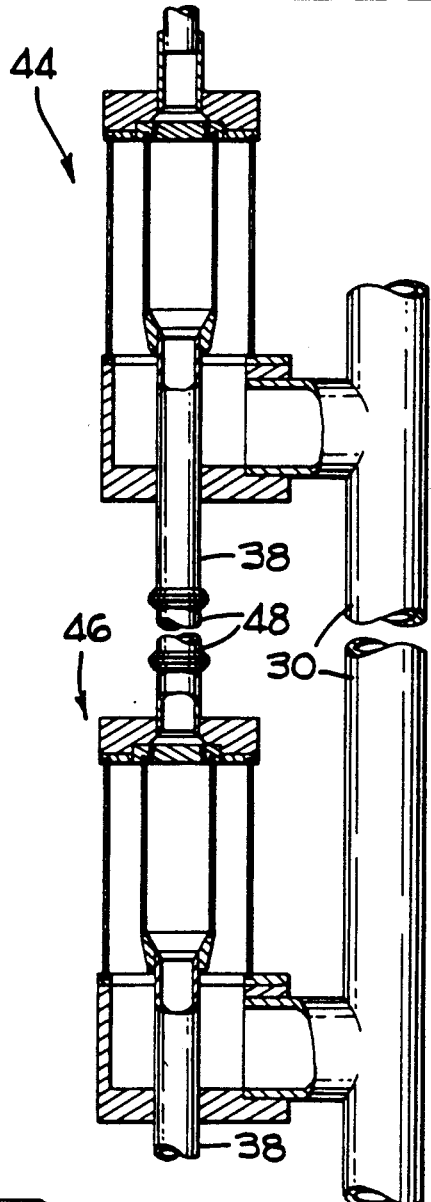
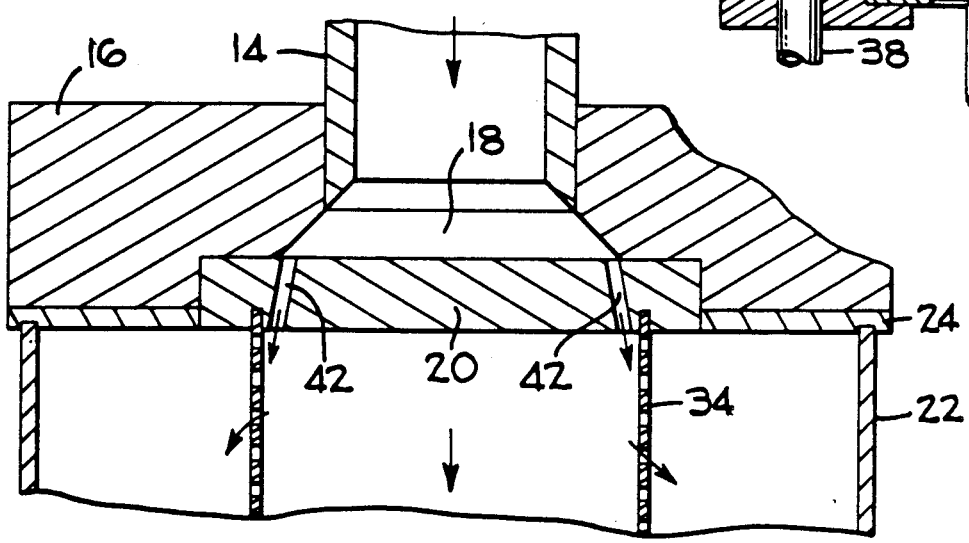

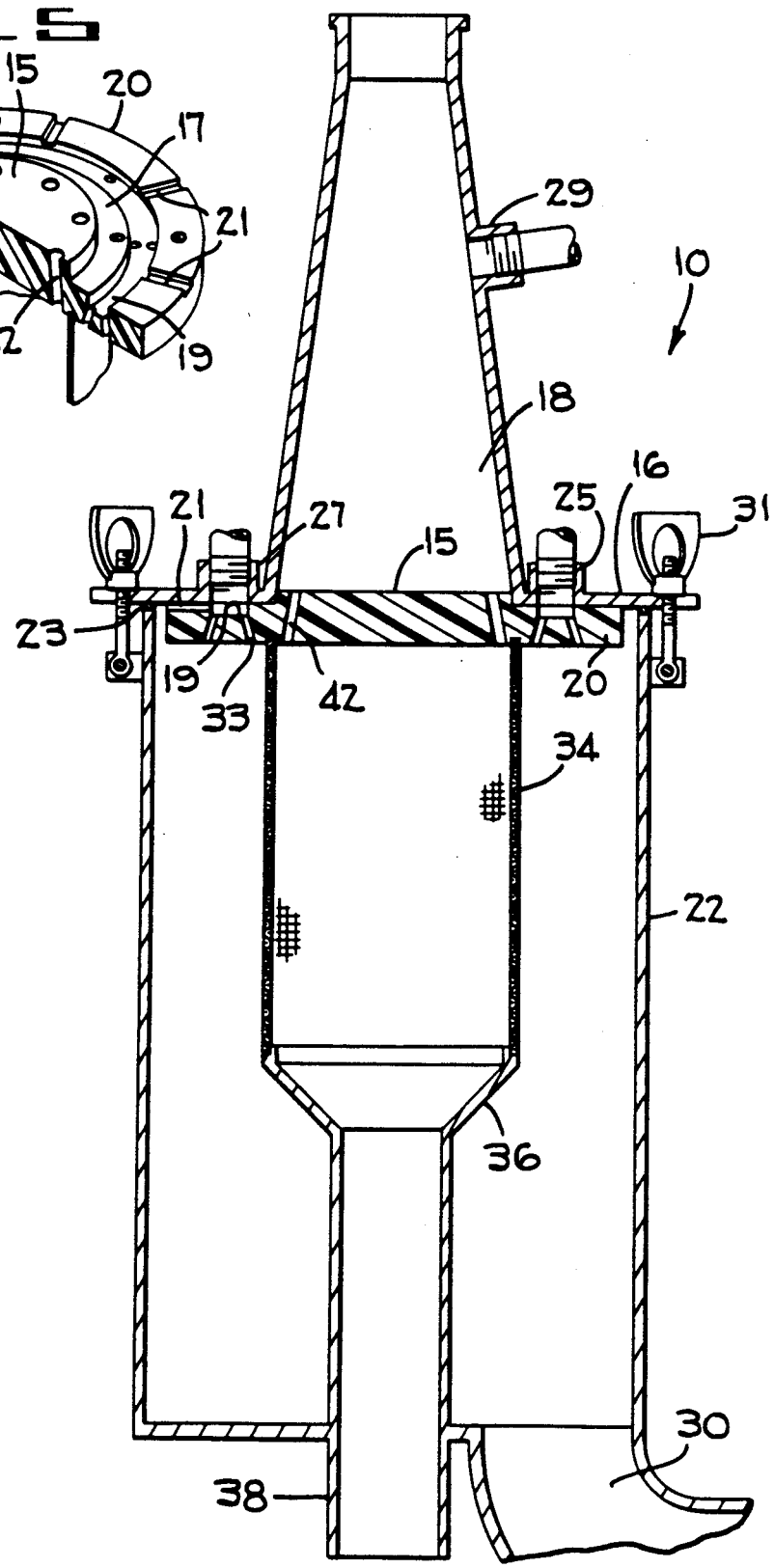

MODULAR LONGITUDINAL SPRAY FINISHER

BACKGROUND OF THE INVENTION

This invention has to do with juice extraction process improvements affecting the quality of fruit juice flowing through and being processed by a fruit juice extractor process.

The typical juice production plant is equipped to process a stream of juice from primary extraction machines.

The extract, or raw juice stream, contains a pure liquid component and a pulp component. The pulp component contains juice sacks and other non liquid elements that contribute to the quality of the juice when present in specific quantities but could be detrimental to the quality of the juice when present in too great a quantity.

In order to ensure a good quality juice product it is important to filter the desirable juice component from the raw juice stream. This "finishing" process step has been traditionally done using screens, filters, centrifuges and screw-type finishers that will force the raw juice under pressure through a chamber provided with screen sections that screen out and prevent the inclusion of pulp in the processed juice stream.

The invention presented herein is a raw juice filtering device that will filter the pulp and other undesirable elements from the raw juice and produce a clear stream of finished juice after.

FIELD OF THE INVENTION

This invention has to do with the filtering and finishing of fruit juice by directing a stream of raw juice at a filter screen at a selected angle in order to maximize juice quality by the gentle handling of juice sacks.

BRIEF DESCRIPTION OF THE DRAWING FIGURES

FIG. 1 is a cross-sectioned view of a portion of a juice strainer in elevation.

FIG. 2 is a portion of the juice strainer of FIG. 1 in a cross-sectioned view with parts broken away to show the invention in detail.

FIG. 3 is a pictorial view of several juice filters arranged in series to show an alternative embodiment of the invention.

FIG. 4 is a more detailed cross sectional presentation of a preferred embodiment of the juice strainer shown in FIG. 1.

FIG. 5 is a broken away portion of the juice strainer in a perspective cross section.

DETAILED DESCRIPTION OF THE INVENTION

The invention will be easily understood by a review of the drawing figures in conjunction with the reading of the following description of a preferred embodiment of the invention.

In FIG. 1 a pictorial presentation of the invention has had most of the elements of the juice filter shown in a cross-sectioned depiction for the sake of clarity. FIG. 4 is a more detailed representation of a preferred embodiment of the juice strainer. Like numerals identify like elements in each of the figures.

The juice filter, generally 10, will be plumbed to a source of raw juice, such as citrus juice, through tubing 12. The source of raw juice can be an inline juice extractor, other primary clarifier equipment, bulk storage tanks or a similar source. The tubing 12 leads to an inlet port 14 attached to an end cap 16. The end cap 16 includes a manifold portion 18 into which is fitted an orifice plate 20.

The end cap 16 of the FIG. 4 embodiment is a variation of the end cap 16 of FIG. 1. In FIG. 4 the end cap 16 is generally a flat plate of a size large enough to overlap the walls of the housing 22 and thereby seal off the end of the housing 22. A seal 23 may be positioned between the end cap and the housing 22. The end cap 16 further includes at least one auxiliary inlet port 25 as well as other auxiliary inlet ports such as 27 and 29. The purpose of the auxiliary ports will be described further on.

The FIG. 4 embodiment also includes end cap retaining means such as 31, comprising a fastener portion and a bolt portion, that will be easily operable to allow removal of the end cap 16 from the housing 22.

Although the shape of the FIG. 4 housing is different in detail from the housing depicted in FIG. 1, the functional elements will perform in the same manner. For instance, item 30, the outlet means, is the conduit for the discharge of the processed juice from each embodiment and the pulpy juice discharge line, 38 in both embodiments, performs the function of the outlet for the pulpy juice in both embodiments.

Furthering the explanation of the invention it is seen that the end cap 16 seals the end of a housing 22, preferably by means of a sealing gasket (23 in FIG. 4) and 24 in FIG. 1. In FIG. 1 the housing 22 extends to a juice receiving manifold 26 and is sealed with a gasket 28. The juice receiving manifold 26 exits into an outlet means 30 which directs the finished juice 32 to a collection tank or other processing station which is not shown.

Inboard of the containment housing 22 is a filter or separating screen 34 which is indexed to the orifice plate 20 generally such that the filter screen 34 closes any gap between itself and the orifice plate 20. The lower end of the filter screen 34 is sealingly connected through a screen adaptor 36 to a pulpy juice discharge line 38 which will lead either to a further processing station or to a storage facility.

FIG. 2 is an expanded view of a portion of the inlet area of the juice filter shown in FIG. 1. Shown is the inlet port 14 wherein raw juice 40 in FIG. 1 is supplied to the manifold portion 18. The orifice plate 20 and the filter screen 34 are clearly shown. More easily discerned in FIG. 2, and clearly presented in FIGS. 4 and 5, are the angled orifices 42 through which all the raw juice entering the manifold portion 18 must pass before entering the screen chamber surrounded by filter screen 34.

FIG. 5 is presented to give a clear understanding of the orifice plate 20 that is used in the FIG. 4 embodiment. The orifice plate 20 includes a first plane 15 that fits into the manifold 18 and is the surface which the raw juice first encounters as it passes through the finisher. Surface 17 provides a sealing surface interfacing with the end cap 16 at the intersection with the manifold portion 18. Channel 19 is proximate the inlet of the auxiliary inlet ports 25 and 27 and provides a distribution means for fluid being supplied by these ports to radial channels such as 21 and auxiliary orifices such as 33.

The operation of the invention, what may be properly called a "spray finisher", will be explained by reference to FIGS. 1 and 2.

The raw juice stream 40 is under pressure when in the area above the inlet orifice plate 20 and can only escape the manifold by passing through the orifices 42 in the plate. A plurality of orifices can be provided in order to ensure adequate flow of raw juice through the juice finisher although only two orifices appear in the sectioned view of the orifice plate.

The orifices are directed toward the separating screen 34 at a predetermined angle, in a preferred embodiment as shown in FIG. 1, the orifices are at an angle of ten degrees from the vertical. It is expected that different angles for the orifices will be necessary in order to fine tune the preferred embodiment device. The use of a removable orifice plate facilitates the use of different plates having different orifice angles, different numbers of orifices and different orifice sizes to accomplish the optimum juice processing.

The orifices will direct raw juice under pressure at the separating screen 34. The screen, of course, could be of many different flow capacities and perforation sizes, but in the preferred embodiment, a screen having holes of twenty-seven thousandths (0.027) of an inch in diameter and 25% open area work well for processing raw orange juice.

When the jet of raw juice strikes the separating screen at the chosen angle, here ten degrees, the raw juice will separate primarily through friction from the pulp in the raw juice stream with the screen surface. Due to the angle of the orifice and the pressure behind the raw juice jet, a longitudinal spray pattern will be developed. This spray pattern has sufficient energy to push the pulp contained in the raw juice stream away from the area where the raw juice contacts the separating screen without forcing the pulp into and/or through the screen holes. The more liquid component of the juice stream will pass through the screen holes and into the chamber surrounded by the housing 22 and to the outlet means 30 and eventually to subsequent processing.

The pulpy juice will be trapped in the interior chamber formed by the screen and forced into the pulpy juice discharge line 38 also for subsequent processing.

A major benefit of this process of separating raw juice into a pulpy juice portion and a clarified juice portion is that the process is easy on the pulp and does not damage the pulp the way other types of finishers damage the pulp. Keeping the pulp from damage reduces the amount of undesirable flavor traces in the finished juice. As a result of the more gentle handling of the pulp, the juice produced contains lower screen pulp and centrifuge solids content than can otherwise be attained through the use of contemporary juice finishers. As the pulp carries a higher concentration of oil than the finished juice, and since this screen handles the pulp in a gentle manner the oil is not forced from the pulp at the separation stage. This results in a lower oil content in the juice. Lower oil content has been found to be a desirable feature.

The longitudinal spray pattern mentioned above is advantageous as the pulpy juice stream flows across the screen surface under pressure, from fifty to sixty percent of the juice is separated within three inches of where the jet of raw juice impinges the screen when ten degree orifice angles are used.

The slurry of is pushed down the screened chamber into the pulpy juice outlet port.

FIG. 3 shows an alternative embodiment of the invention wherein two modular longitudinal finishers generally 44 and 46 are connected in series to increase the yield of juice extracted from the raw juice stream. The entire setup is as shown in the detailed drawing of FIGS. 1 and 2 except that there are multiple juice finishers in FIG. 3.

The second finisher 46 is fed pulpy juice from the pulpy juice discharge tube of the first finisher 44 and proceeds to separate the juice as heretofore explained. The pressure for providing the jet of juice comes either from the column of pulpy juice discharged from the first finisher 44 or by a mechanical or other source of pressure. A common manifold 30 can receive the juice and deliver it to the next processing station. A pulpy juice discharge line 38 is provided as it was for the FIG. 1 embodiment. The break in the pulpy juice discharge line 38 between the first 44 and second 46 finishers is simply a pictorial representation of indeterminate pipe length.

It is also contemplated that a plurality of finishers could be arranged in series. This would allow further filtration of the outflow of an upstream finisher. Obviously, combinations of series and parallel finishers are also possible.

The function of the auxiliary ports and orifices can best be understood by reviewing FIGS. 4 and 5. The auxiliary inlet ports 25, 27 and 29 provide access to processing aids and sanitation aids. For instance, all or any combination of the auxiliary inlet ports 25, 27 and 29, can be used to clean the finisher by allowing the introduction of cleaning fluids such as water into the finisher before or after the finisher has processed raw juice. Water entering the auxiliary inlet port 29 would flow through the manifold 18 and the angled orifices 42 to impinge on the screen 34 to rinse at least the interior of the screen of pulp and residue.

Cleaning fluid or water pumped into auxiliary ports 25 and 27 will enter the housing 22 through auxiliary orifices such as 33 to flush the interior of the chamber.

The auxiliary ports and orifices are also used, when desirable to do so, for allowing an inert gas such as nitrogen, to be supplied to the processing environment. The inert gas environment slows down the oxygenation of the juice stream and assists in maintaining the quality of the juice being processed. It is also contemplated that the auxiliary ports and orifices can be used for inputting other process aids, additives, flavor enhancers and extenders as deemed beneficial to the production of the final product.

Other embodiments of multiple finishers are also contemplated by the inventor. These include parallel finishers where a finisher having a finer gauge screen is interposed in the clarified juice stream after the raw juice has passed through a more coarse finisher, finishers with orifices in the orifice plate of different angles so that more of the screen surface can be impinged with the raw juice jet and other design nuances that are contemplated as being covered by the following claims.

What is claimed is:

1. A filter means for separating a liquid slurry into a clarified component and a reduced liquid component, said filter means having a housing, said filter means comprising:

an inlet port for receiving said liquid slurry;

orifice plate means in communication with said inlet port and having orifice means for directing said liquid slurry;

screen means positioned outboard of said orifice means, said screen means providing an interior chamber having angled walls, said angled walls from an angle of less than ninety degrees, in said filter means housing contingent with said orifice plate means in the path of said liquid slurry being directed at said screen means by said orifice means;

manifold means for receiving said clarified component outside said screen means chamber, and a discharge line means for receiving said reduced liquid component from said interior chamber of said screen.

2. The invention in accordance with claim 1 wherein said orifice plate means is provided with one or more auxiliary inlet ports.

3. The invention in accordance with claim 2 wherein said inlet port is provided with an auxiliary inlet port.

4. The invention in accordance with claim 3 said auxiliary inlet port in said inlet port is used to allow the passage of an inert gas into said inlet port.

5. The invention in accordance with claim 2 wherein said auxiliary inlet port is used to allow the passage of an inert gas into said filter means.

6. A filter means for separating a liquid slurry into a clarified component and a reduced liquid component, said filter means having a housing, said filter means comprising:

an inlet port for receiving said liquid slurry;

orifice plate means in communication with said inlet port and having orifice means for directing said liquid slurry;

screen means positioned outboard of said orifice means, said orifice means being angled at an angle of less than ninety degrees from the surface of said screen means, said screen means providing an interior chamber in said filter means housing contingent with said orifice plate means in the path of said liquid slurry being directed at said screen means by said orifice means;

manifold means for receiving said clarified component outside said screen means chamber, and a discharge line means for receiving said reduced liquid component from said interior chamber of said screen means.

* * * * *